C. HARRISON & K. LAMOND.
PNEUMATIC TIRE PRESSURE GAGE.
APPLICATION FILED JAN. 31, 1917.
1,237,512.
Patented Aug. 21, 1917.
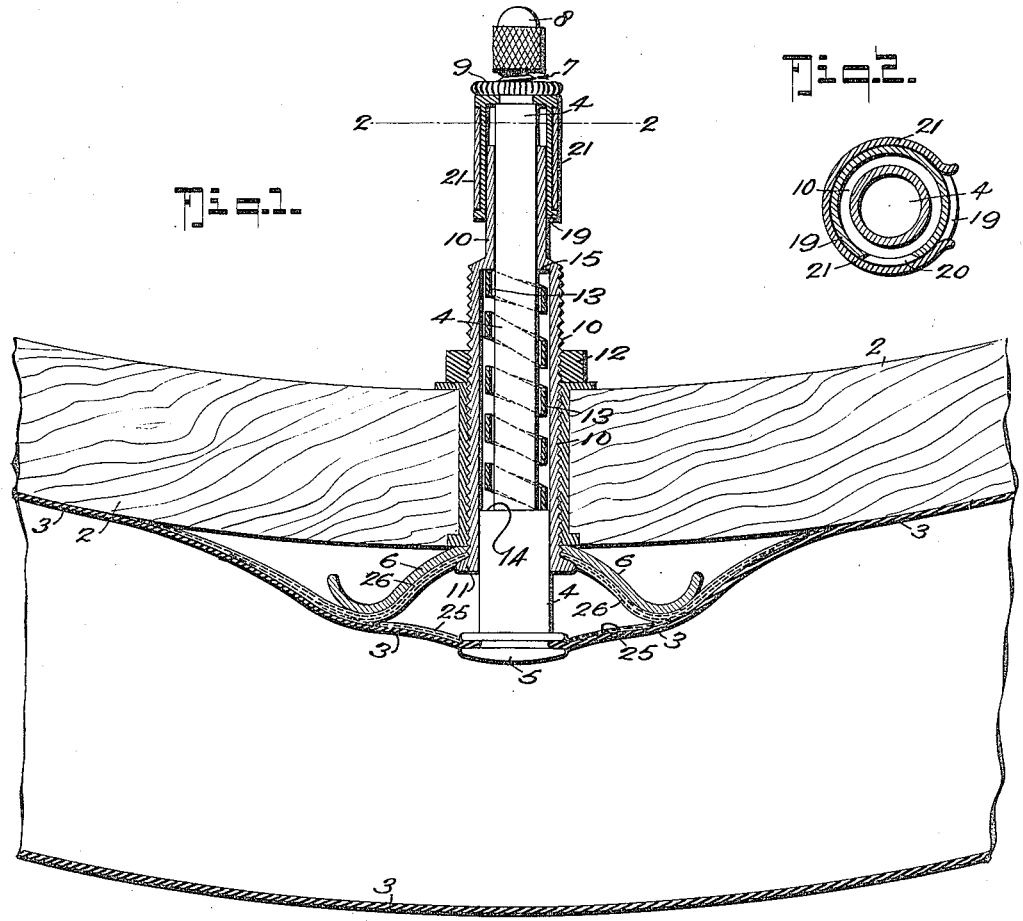
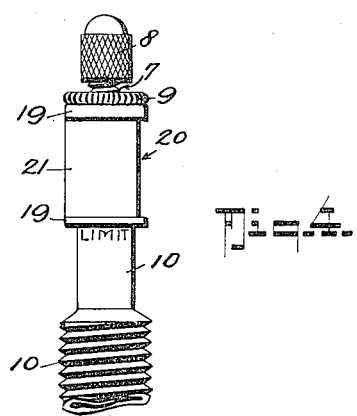
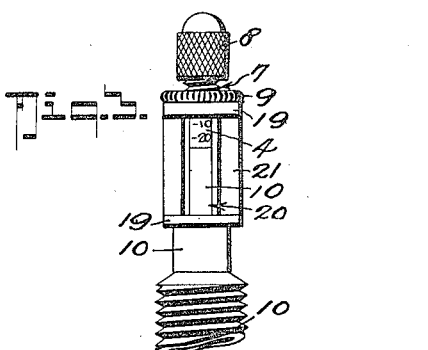
INVENTOR
Charles Harrison.
Kenneth Lamond.
BY
Fred G. Dieterich
ATTORNEYS

UNITED STATES PATENT OFFICE.

CHARLES HARRISON AND KENNETH LAMOND, OF VANCOUVER, BRITISH COLUMBIA, CANADA.

PNEUMATIC-TIRE PRESSURE-GAGE.

1,237,512.　　　　　　　　Specification of Letters Patent.　　Patented Aug. 21, 1917.

Application filed January 31, 1917.　Serial No. 145,778.

*To all whom it may concern:*

Be it known that we, CHARLES HARRISON and KENNETH LAMOND, citizens of the Dominion of Canada, residing at Vancouver, in the Province of British Columbia, Canada, have invented certain new and useful Improvements in Pneumatic-Tire Pressure-Gages, of which the following is a specification.

This invention relates to a pressure gage for a pneumatic tire, and is designed to indicate the pressure of the air inflating the tire by the expansion of a definite area of the inner tire tube, against a spring resistance.

This object is attained by projecting through the rim of the wheel and connecting to the inner side of the inner tube of the tire a member having a spring resistance tending to project it into the tire tube. This member, as the tire is inflated, will be pressed from the inner circumferential face of the rim of the wheel against the spring resistance and will indicate in the amount it is projected the pressure of the air with which the tire is inflated.

The invention here set forth is an improvement on that on which Letters Patent 1,214,781 were issued to us on Feb. 6, 1917, the improvements being particularly directed to the provision of a means whereby the area of the inner tube on which the pressure is measured is limited, and to a means depriving this area of its elasticity, so that the distention of it is a fair measure of the pressure inflating the tire, as it is not expended in stretching the material of the inner tube.

As the valved tube through which a tire is inflated is attached to the inner tube and projects through the rim of its wheel, this valve tube itself forms a convenient means for attachment of the pressure indicating spring and scale.

The invention is particularly described in the following specification, reference being made to the drawings by which it is accompanied, in which:

Figure 1 shows in longitudinal section the application of the device to the valve tube of a pneumatic tire.

Fig. 2 is a section on an enlarged scale on the line 2—2 in Fig. 1.

Fig. 3 is an elevation of the guard thimble, secured to the end of the valve tube showing it open, revealing the scale, the tire being partially inflated, and Fig. 4 is a similar view showing the thimble closed as protecting the scale, the tire being inflated to its maximum or safe limit.

In these drawings 2 represents the rim of the wheel and 3 the inner tube of the tire, 4 being the valve tube through which the tire is charged with air. This valve tube 4 is secured at 5 to the inner tube 3 of the tire in the usual manner, and immediately adjacent the attachment, the material of the tube 3 is reinforced and is rendered substantially non-elastic by a patch 25 of canvas or the like material cemented to it.

The valve tube 4 is, as usual, threaded at its outer end 7 for connection to it of the pump or air service tube, and for the cap 8 by which it is closed.

Instead of the valve tube 4 being secured in the rim 2 of the wheel, as is usually the case, it is movable endwise through it in a tubular bushing 10 secured in the rim between a flanged end 11 and cupped guard 6 on the outer side of the rim 2 and a nut 12 threaded on the tube 10 to bear against the inner side of the rim. The inner end of the bushing 10 is projected beyond the inner circumferential surface of the rim and forms a casing for a coiled compression spring 13 which is located within the bushing between a shoulder 14 formed on the valve tube 4, and an inwardly projecting shoulder 15 formed on the inner end of the bushing 10. This spring 13 thus tends to project the valve tube attachment to the inner tube 3 of the tire, within the circumferential limit of the inner tube when it is inflated, and as pressure of inflation increases the valve tube 4 will be pressed, against the resistance of the spring 13, through the bushing 10 in the rim 2, and the amount of such movement will indicate the pressure with which the tire is inflated.

To limit the area of the inner tube 3 on which the pressure is to be measured by the resistance of the spring 13, a patch of stout canvas 26 is cemented on the reinforcing patch 25 of the tire tube, so as to leave free a circular area surrounding the valve tube. The free area of this patch 26 is centrally apertured to permit passage of the bushing 10 through it and the edge of the central aperture is secured between the flange 11 of the bushing 10 and the sheet metal guard 6 which is interposed between the flange 11 and the rim 2 of the wheel. The guard 6 is cupped somewhat as shown in the drawing, the edge of the cup corresponding substantially to the circumference of the free area of the patch 26, which is also cupped to correspond with the guard. The patch 26 and the cupped guard 6 thus practically limit the area of the inner tube, the outward extension of which is to be measured by the spring 13, and the patch 25 prevents the air pressure stretching the rubber of the inner tube 3 over the area which it is desired to measure the pressure on.

This means for limiting the area on which the pressure is measured, and the means for rendering the same inelastic are important features of the invention, as enabling a definite strength of spring and definite graduation to be used.

The end of the valve tube 4 which under pressure projects beyond the inner end of the bushing tube 10, within which the spring is retained, is graduated to indicate the pressure, and these graduations are read from the end of the bushing tube. To protect the graduated end of the valve tube 4 from accumulation of dust or mud which may collect on it, a thimble 19 is fitted on a slight shoulder formed on the stem 4 at the end of the thread which receives the cap 8, and is secured thereon by a milled nut 9 threaded on the stem. The inside of this thimble 19 slidably fits the reduced end of the bushing 10 and is segmentally apertured, as at 20, that the pressure graduations of the stem of the tube 4 may be read through it. A segmental sleeve 21 is rotatably mounted in a circumferential recess provided for it in the outer surface of the thimble 19, which segmental sleeve may be rotated to open or close the aperture 20 of the thimble 19.

The outer surface of the reduced end of the bushing 10 has a mark indicating the safe limit of pressure which it is desired the tire should carry and this mark is so placed as to be uncovered by the lower edge of the sleeve 19, as shown in Fig. 4, when the tire is inflated to its maximum safe limit.

A convenient means is thus provided for ascertaining the pressure which exists in an automobile tire without the necessity of making a separate connection and with the advantage that it is always in position.

Having now particularly described our invention, we hereby declare that what we claim as new and desire to be protected in by Letters Patent, is:

1. A pneumatic tire pressure gage, comprising the combination with the rim of a wheel and the inner tube of its tire, of a valved tube secured to the inner tire tube and through which the tire tube is inflated, said valved tube having a scale, a tubular bushing secured in the rim of the wheel in which bushing the valve tube is endwise movable, a spring tending to project the end of the valve tube which is attached to the inner tube of the tire within the tire tube, an apertured thimble secured on the free end of the valve tube which projects through the bushing, said thimble slidable on the outside of the bushing and adapted to expose said scale through the thimble aperture and a shutter for closing the aperture of the thimble.

2. A pneumatic tire pressure gage, comprising the combination with the rim of a wheel and the inner tube of its tire, of a valved tube secured to the inner tire tube and through which that tube is inflated, a tubular bushing secured in the rim of the wheel in which bushing the valve tube is endwise movable, a spring tending to project the end of the valve tube which is connected to the inner tire tube within the inner circumferential limit of that tube, means for limiting the area of the inner tire tube which is opposed to the spring, and means for rendering said limited area inelastic.

3. A pneumatic tire pressure gage, comprising the combination with the rim of a wheel and the inner tube of its tire, of a valved tube secured to the inner tire tube and through which the tire tube is inflated, a tubular bushing secured in the rim of the wheel in which bushing the valve tube is endwise movable, a cupped guard secured to the end of the bushing adjacent the valve tube connection to the tire, a flexible inelastic patch on the inner tube of the tire surrounding the connection of the valve tube thereto, a flexible inelastic patch cemented on the aforementioned patch in a circle surrounding the valve tube connection to the tire so as to leave the central circular portion free from the tire tube, said central free portion apertured to permit the valve tube to pass through it, means for connecting the edge of the central aperture of this patch to the adjacent end of the bushing in the rim of the wheel, a spring tending to project the end of the valve tube which is connected to the tire tube within the inner circumferential limit of that tube, and means for indicating endwise movement of the valve tube in the bushing.

4. A pneumatic tire pressure gage, comprising the combination with the rim of a wheel and the inner tube of its tire, of a valved tube secured to the inner tire tube, and through which the inner tire tube is inflated, a tubular bushing secured in the rim of the wheel in which bushing the valve tube is endwise movable, a spring tending to project the end of the valve tube which is connected to the inner tube of the tire within the circumferential limit of that tube, means for limiting the area of the inner tire tube which is opposed to the spring, said means comprising a rigid cupped guard secured to the adjacent end of the bushing, an inelastic flexible patch apertured to pass on to the bushing and secured by the edge of the aperture to the adjacent end of the bushing inside the cupped guard, said patch cemented to the inner tube of the tire in a circle corresponding to the edge of the cupped guard, and means for rendering inelastic the area of the inner tube within the circumferential edge of the flexible inelastic patch.

In testimony whereof we affix our signatures.

CHARLES HARRISON.
KENNETH LAMOND.